United States Patent
Ching et al.

(10) Patent No.: US 11,157,087 B1
(45) Date of Patent: Oct. 26, 2021

(54) ACTIVITY RECOGNITION METHOD, ACTIVITY RECOGNITION SYSTEM, AND HANDWRITING IDENTIFICATION SYSTEM

(71) Applicant: Compal Electronics, Inc., Taipei (TW)

(72) Inventors: Yun-Chiu Ching, Taipei (TW); Yi-Ching Chen, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 17/074,940

(22) Filed: Oct. 20, 2020

(30) Foreign Application Priority Data

Sep. 4, 2020 (TW) .................. 109130364

(51) Int. Cl.
*G06F 3/01* (2006.01)
*G06K 9/00* (2006.01)
*G06F 3/0488* (2013.01)

(52) U.S. Cl.
CPC .......... *G06F 3/017* (2013.01); *G06F 3/04883* (2013.01); *G06K 9/00355* (2013.01)

(58) Field of Classification Search
CPC .. G06F 3/017; G06F 3/04883; G06K 9/00355
See application file for complete search history.

(56) References Cited

U.S. PATENT DOCUMENTS

| | | | | |
|---|---|---|---|---|
| 6,012,058 A * | 1/2000 | Fayyad | ............... | G06K 9/6223 |
| 9,110,510 B2 * | 8/2015 | Moore | ............... | G06F 3/04842 |
| 9,354,709 B1 * | 5/2016 | Heller | ................. | G06F 3/017 |
| 9,547,369 B1 * | 1/2017 | Wernick | ................. | G06F 16/58 |
| 10,348,355 B2 | 7/2019 | Camacho Perez et al. | | |
| 10,719,765 B2 * | 7/2020 | Novik | ................... | G06F 21/316 |
| 2006/0085405 A1 * | 4/2006 | Hsu | ........................ | G06F 16/93 |
| 2009/0027398 A1 * | 1/2009 | Frisken | ................ | G06T 11/203 |
| | | | | 345/442 |
| 2015/0046886 A1 * | 2/2015 | Goel | ....................... | G06F 1/163 |
| | | | | 715/863 |
| 2015/0055855 A1 * | 2/2015 | Rodriguez | ............ | G06K 9/627 |
| | | | | 382/159 |
| 2016/0018872 A1 | 1/2016 | Tu et al. | | |
| 2016/0070958 A1 * | 3/2016 | Whelan | ............... | A61B 5/1123 |
| | | | | 382/107 |
| 2017/0039480 A1 | 2/2017 | Bitran et al. | | |
| 2017/0177999 A1 * | 6/2017 | Novik | ................... | G06F 21/316 |

(Continued)

FOREIGN PATENT DOCUMENTS

| TW | I592136 B | 7/2017 |
|---|---|---|
| TW | I625114 B | 6/2018 |

OTHER PUBLICATIONS

Florian Schroff et al., FaceNet: A Unified Embedding for Face Recognition and Clustering, arXiv:1503.03832v3 [cs.CV] Jun. 17, 2015.

*Primary Examiner* — Grant Sitta
(74) *Attorney, Agent, or Firm* — Kirton McConkie; Evan R. Witt

(57) ABSTRACT

An activity recognition method includes steps of obtaining a plurality of embedded feature values, converting a data set obtained by at least one sensor into an activity feature value, comparing the activity feature value with the embedded feature values to generate a comparison result, and performing an activity recognition according to the comparison result. Therefore, the present invention achieves the advantages of precisely recognizing activities.

10 Claims, 15 Drawing Sheets

(56) References Cited

U.S. PATENT DOCUMENTS

| | | | | |
|---|---|---|---|---|
| 2017/0371417 | A1* | 12/2017 | Iyer | G06K 9/00335 |
| 2018/0005058 | A1* | 1/2018 | Yang | G06K 9/00422 |
| 2018/0012003 | A1* | 1/2018 | Asulin | G06F 21/316 |
| 2018/0018533 | A1* | 1/2018 | Taranta, II | G06K 9/00416 |
| 2018/0096230 | A1* | 4/2018 | Luan | G06T 7/60 |
| 2018/0330238 | A1* | 11/2018 | Luciw | G06K 9/6253 |
| 2019/0172232 | A1* | 6/2019 | Penatti | G06T 11/206 |
| 2019/0269970 | A1 | 9/2019 | Canavan et al. | |
| 2019/0342329 | A1* | 11/2019 | Turgeman | G06F 3/0488 |
| 2019/0378397 | A1* | 12/2019 | Williams, II | G06N 5/046 |
| 2020/0042580 | A1* | 2/2020 | Davis | G06F 40/169 |
| 2020/0117889 | A1* | 4/2020 | Laput | G06K 9/6267 |
| 2020/0411159 | A1* | 12/2020 | Chien | G06F 1/163 |
| 2021/0012100 | A1* | 1/2021 | Hoffmann | G06K 9/622 |

\* cited by examiner

ACTIVITY RECOGNITION METHOD, ACTIVITY RECOGNITION SYSTEM, AND HANDWRITING IDENTIFICATION SYSTEM

CROSS-REFERENCE TO RELATED APPLICATION

This application claims priority from Taiwan Patent Application No. 109130364, filed on Sep. 4, 2020, the entire contents of which are incorporated herein by reference for all purposes.

FIELD OF THE INVENTION

The present invention relates to a recognition method, and more particularly to an activity recognition method, an activity recognition system, and a handwriting identification system.

BACKGROUND OF THE INVENTION

An artificial intelligence (AI) technology uses computer programs to present the intelligence of human. Currently, the preliminary results have surpassed human intelligence in the fields of language analysis and board games. The application of artificial intelligence in activity recognition is continuously developed. It is expected that it will have better performance in the future, so that the more convenient life will be brought to people.

Please refer to FIG. 1 and FIG. 2. FIG. 1 schematically illustrates a statistic chart of an over-generalization artificial intelligence model of prior art. FIG. 2 schematically illustrates a statistic chart of an over-optimization artificial intelligence model of prior art. As illustrated in FIG. 1 and FIG. 2, curves represent matching curves of an artificial intelligence model, and points represent practical data. As shown in FIG. 1, when the difference between the matching curve of the artificial intelligence model and the practical data is quite large, the artificial intelligence model is an over-generalization artificial intelligence model which cannot be effectively corresponded to practical data. FIG. 2 shows the common artificial intelligence model currently used in prior art. When the human activity is recognized by this artificial intelligence model, the performance is good in the training set but poor in the test set. That is, the performance in response to data that has never been seen is extremely poor. This artificial intelligence model is an over-optimization artificial intelligence model which do not have enough ability of generalization.

In particular, the generalization ability represents the performance in response to data that has never been seen, and the optimization ability represents the performance of finding the best parameters to minimize the loss of the training set. In machine learning, the equilibrium between optimization and generalization is particularly important. In the process of adjusting the equilibrium between optimization and generalization, it may cause the problem of inaccurate judgment of basic activity.

Therefore, there is a need of providing an activity recognition method, an activity recognition system, and a handwriting identification system having enough generalization ability that are able to precisely recognize activities and save resources, and are distinct from prior art in order to solve the above drawbacks.

SUMMARY OF THE INVENTION

Some embodiments of the present invention are to provide an activity recognition method, an activity recognition system, and a handwriting identification system in order to overcome at least one of the above-mentioned drawbacks encountered by prior art.

The present invention provides an activity recognition method, an activity recognition system, and a handwriting identification system. By converting the data set obtained by the sensor into the activity feature value, comparing the activity feature value and the embedded feature values to generate the comparison result, and performing the activity recognition according to the comparison result, the advantages of precisely recognizing activities are achieved.

The present invention also provides an activity recognition method, an activity recognition system, and a handwriting identification system. Through the method and the framework of automatic learning and continuous learning with artificial intelligence, the activity recognition ability of the present invention can be continuously adjusted and trained, such that the activity recognition ability is more consistent with the activity of the user, and the generalization ability is effectively improved without over-optimization. In addition, since the present invention only records the count value corresponding to the activity feature value and the adjusted center point value, it can effectively reduce the calculation and memory usage, thereby reducing the waste of resources and achieving better performance.

In accordance with an aspect of the present invention, there is provided an activity recognition method. The activity recognition method includes steps of obtaining a plurality of embedded feature values, converting a data set obtained by at least one sensor into an activity feature value, comparing the activity feature value with the embedded feature values to generate a comparison result, and performing an activity recognition according to the comparison result.

In accordance with another aspect of the present invention, there is provided an activity recognition system. The activity recognition system includes a control unit, a first sensor, a second sensor, and a database. The first sensor is connected with the control unit. A first sensed data is obtained by the first sensor according to an activity of a user. The second sensor is connected with the control unit. A second sensed data is obtained by the second sensor according to the activity of the user. The database is connected with the control unit. A plurality of embedded feature values are stored in the database. The control unit converts the first sensed data and the second sensed data into an activity feature value and compares the activity feature value with the embedded feature values so as to perform an activity recognition on the activity.

In accordance with another aspect of the present invention, there is provided a handwriting identification system. The handwriting identification system includes a control unit, a sensor, and a database. The sensor is connected with the control unit. Handwriting is obtained by the sensor according to a signing activity of a signer. The database is connected with the control unit. At least an embedded feature handwriting is stored in the database, and the embedded feature handwriting is corresponded to a registered user. The control unit calculates a Euclidean distance between the handwriting and the embedded feature handwriting through a K-means clustering algorithm. When the Euclidean distance is less than or equal to a threshold, the signer is identified as same as the registered user.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
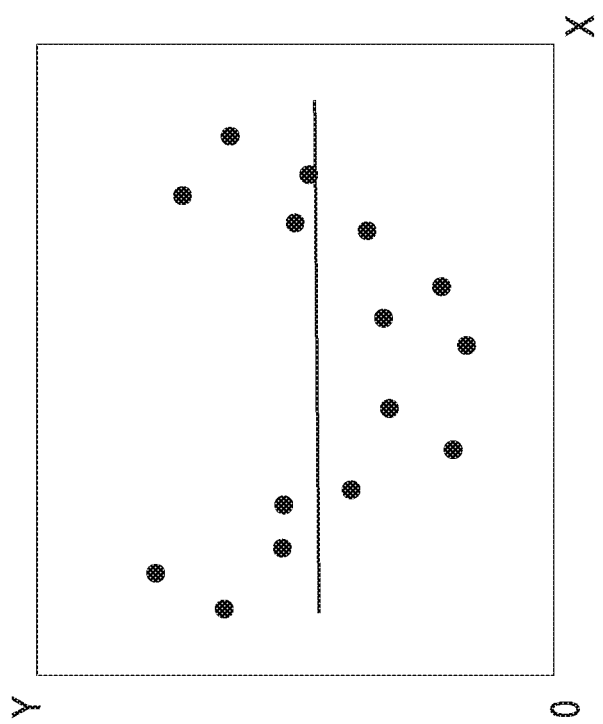
FIG. 1 schematically illustrates a statistic chart of an over-generalization artificial intelligence model of prior art.
Figure 2:
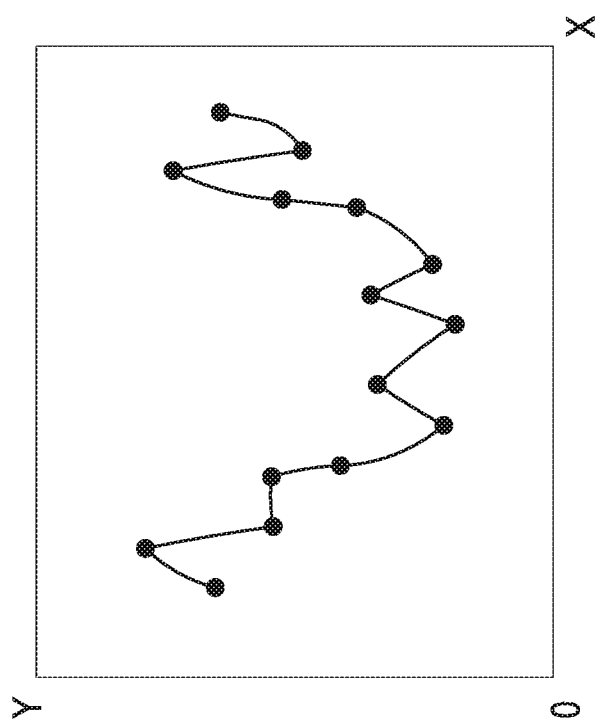
FIG. 2 schematically illustrates a statistic chart of an over-optimization artificial intelligence model of prior art.
Figure 3:
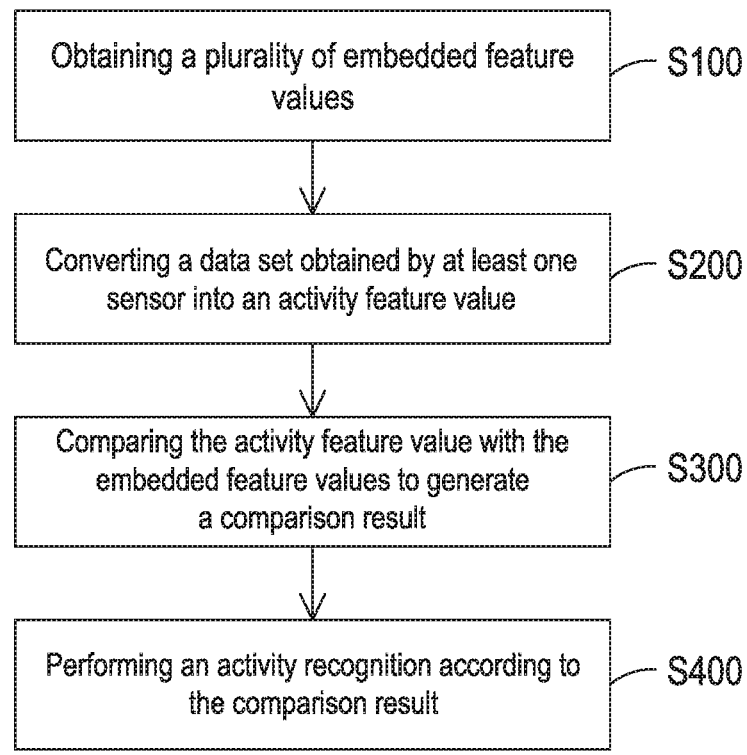
FIG. 3 schematically illustrates a flow chart of an activity recognition method according to an embodiment of the present invention.
Figure 4:
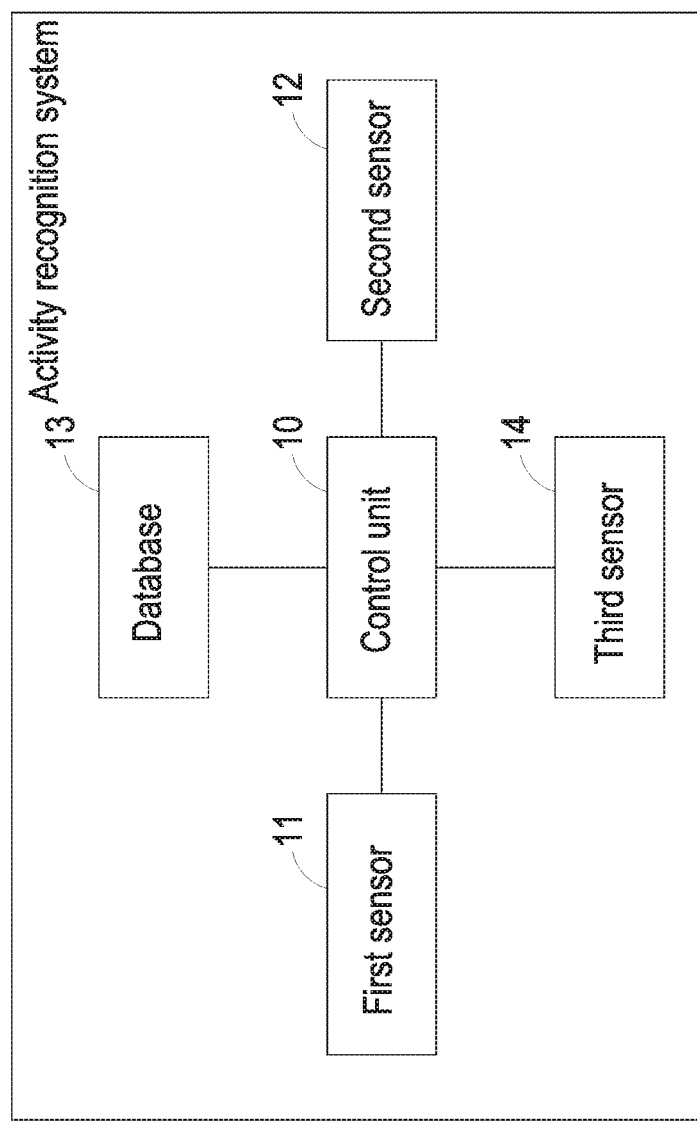
FIG. 4 schematically illustrates a configuration of an activity recognition system according to an embodiment of the present invention.

Please refer to FIG. 3 and FIG. 4. FIG. 3 schematically illustrates a flow chart of an activity recognition method according to an embodiment of the present invention. FIG. 4 schematically illustrates a configuration of an activity recognition system according to an embodiment of the present invention. As shown in FIG. 3 and FIG. 4, an activity recognition system according to an embodiment of the present invention includes steps as following. First of all, as shown in step S100, obtaining a plurality of embedded feature values. Next, as shown in step S200, converting a data set obtained by at least one sensor into an activity feature value. It should be noted that the data set obtained or collected by the sensor is converted into the activity feature value through an artificial intelligence (AI) model, but not limited herein. Then, as shown in step S300, comparing the activity feature value with the embedded feature values to generate a comparison result. Next, as shown in step s400, performing an activity recognition according to the comparison result. As a result, the advantages of precisely recognizing activities are achieved.

In some embodiments, the activity recognition method of the present invention can be implemented by an activity recognition system 1. The activity recognition system 1 includes a control unit 10, a first sensor 11, a second sensor 12, and a database 13. The first sensor 11 is connected with the control unit 10, the second sensor is connected with the control unit 10, and the database 13 is connected with the control unit 10. The step S100 of the activity recognition method of the present invention can be implemented by the control unit 10 with the database 13. The step S200 can be implemented by the control unit 10 with the first sensor 11, or can be implemented by the control unit 10 with the first sensor 11 and the second sensor 12. In addition, the step S300 and the step S400 of the activity recognition method of the present invention can be implemented by the control unit 10 with the database 13. A plurality of embedded feature values are stored in the database 13. In particular, a first sensed data is obtained by the first sensor 11 according to an activity of a user, and a second sensed data is obtained by the second sensor 12 according to the activity of the user. The control unit 10 converts the first sensed data and the second sensed data into an activity feature value and compares the activity feature value with the embedded feature values so as to perform an activity recognition on the activity.

In some embodiments, the first sensor 11 is an accelerometer which is also called a G-sensor, and the second sensor 12 is a gyroscope which is also called a gyro-sensor, but not limited herein. By sensing with the accelerometer and the gyroscope, the six-axis data can be integrated as an activity feature value by the activity recognition method of the present invention. Certainly, the practical application of the present invention is not limited within the six-axis data. The number of sensors can be selected by the practical demands.

In some embodiments, the activity recognition system 1 may further include a third sensor 14. The third sensor 14 is connected with the control unit 10. The third sensor 14 is an accelerometer, a gyroscope, a magnetic sensor, an atmosphere sensor, or a pressure sensor in cooperation with the first sensor 11 and the second sensor 12 in order to provide nine-axis data for being integrated as the activity feature value, thereby enhancing the precision of activity recognition. Also, the pressure variation can be also sensed to assist in recognizing activities under specific environments, such as mountain hiking and diving, but not limited herein.

Figure 6:
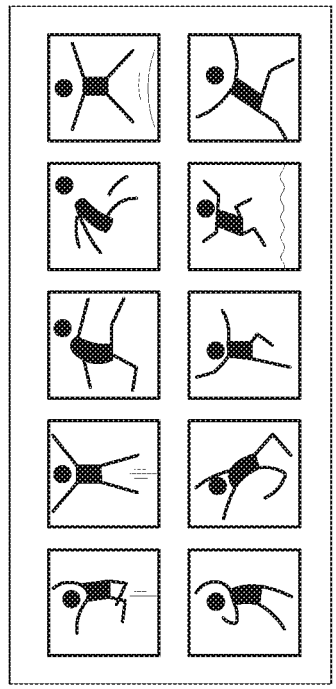
FIG. 6 schematically illustrates activities corresponded to the activity feature value that are probably corresponded to the same embedded feature value.
Figure 5:
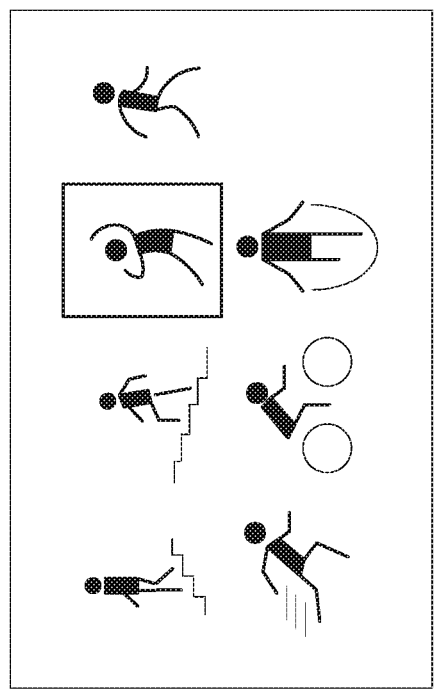
FIG. 5 schematically illustrates activities corresponded to the plurality of embedded feature values of an activity recognition method according to an embodiment of the present invention.

Please refer to FIG. 3, FIG. 5, and FIG. 6. FIG. 5 schematically illustrates activities corresponded to the plurality of embedded feature values of an activity recognition method according to an embodiment of the present invention. FIG. 6 schematically illustrates activities corresponded to the activity feature value that are probably corresponded to the same embedded feature value. As shown in FIG. 3, FIG. 5, and FIG. 6, one of the embedded feature values which is closest to the activity feature value is found out by the comparison result, and each of the embedded feature values is corresponded to an activity. In particular, the embedded feature values of the present invention can be corresponded to activities which are for example going downstairs, going upstairs, jumping, walking, running, riding a bicycle, and rope jumping as shown in FIG. 5, but not limited herein. In an example of jumping, when a user acts as any one of the ten activities shown in FIG. 6, the activity feature value obtained by the activity recognition method of the present invention is corresponded to the embedded feature value of the jumping activity as shown in FIG. 5. In other words, the ten activities shown in FIG. 6 will be recognized as jumping in the step S300 of the activity recognition method of the present invention.

Figure 7:
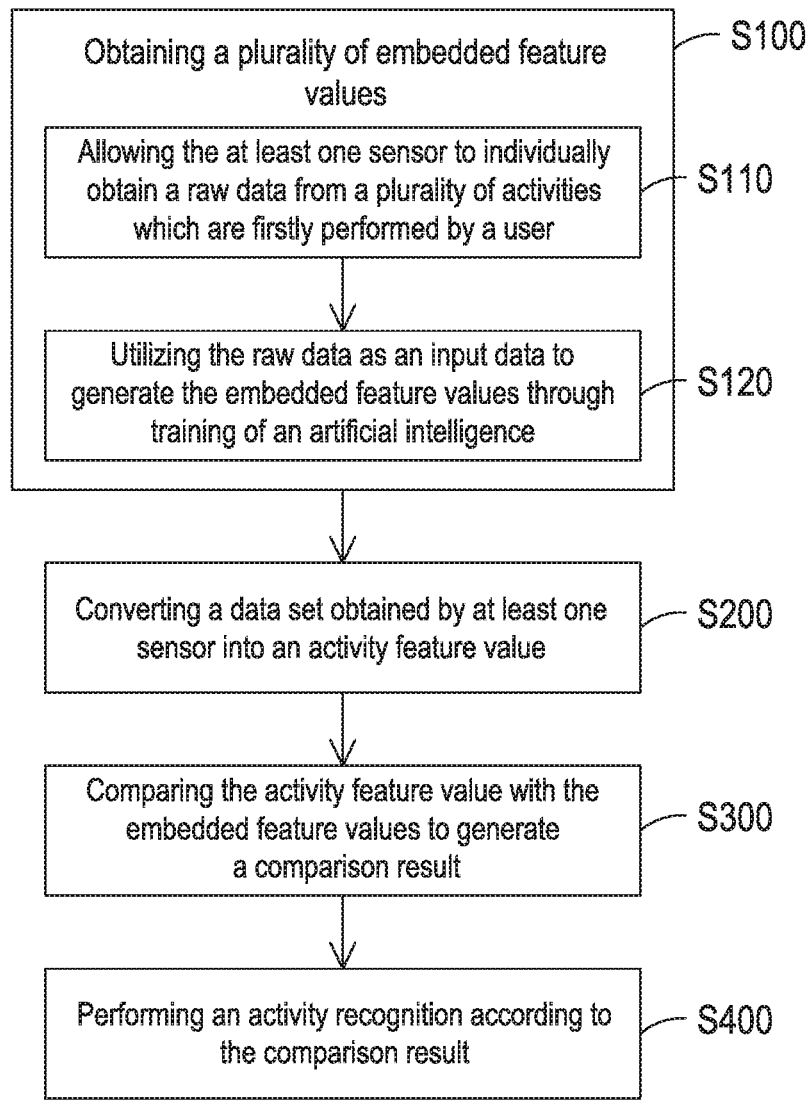
FIG. 7 schematically illustrates a flow chart of an activity recognition method according to an embodiment of the present invention.

Please refer to FIG. 7. FIG. 7 schematically illustrates a flow chart of an activity recognition method according to an embodiment of the present invention. As shown in FIG. 7, according to an embodiment of the present invention, the step S100 of the activity recognition method further includes a step S110 and a step S120. The step S110 is a step of allowing the at least one sensor to individually obtain a raw data from a plurality of activities which are firstly performed by a user. The step S120 is a step of utilizing the raw data as an input data to generate the embedded feature values through training of an artificial intelligence. In specific, the step S110 and the step S120 are steps of preprocessing of input data. For example, when the raw data of the six-axis are obtained by the activity recognition method of the present invention, the raw data will be considered as a frame for training a corresponded embedded feature value. After the frame is formed, the frame will be normalized. After a frame is completed, a preprocessing can be performed to quantify the FLOAT32 data of the frame into INT8, and then an average calculation, a standard deviation calculation, and/or a pre-whitening calculation on the frame can be performed, but not limited herein.

Figure 8:
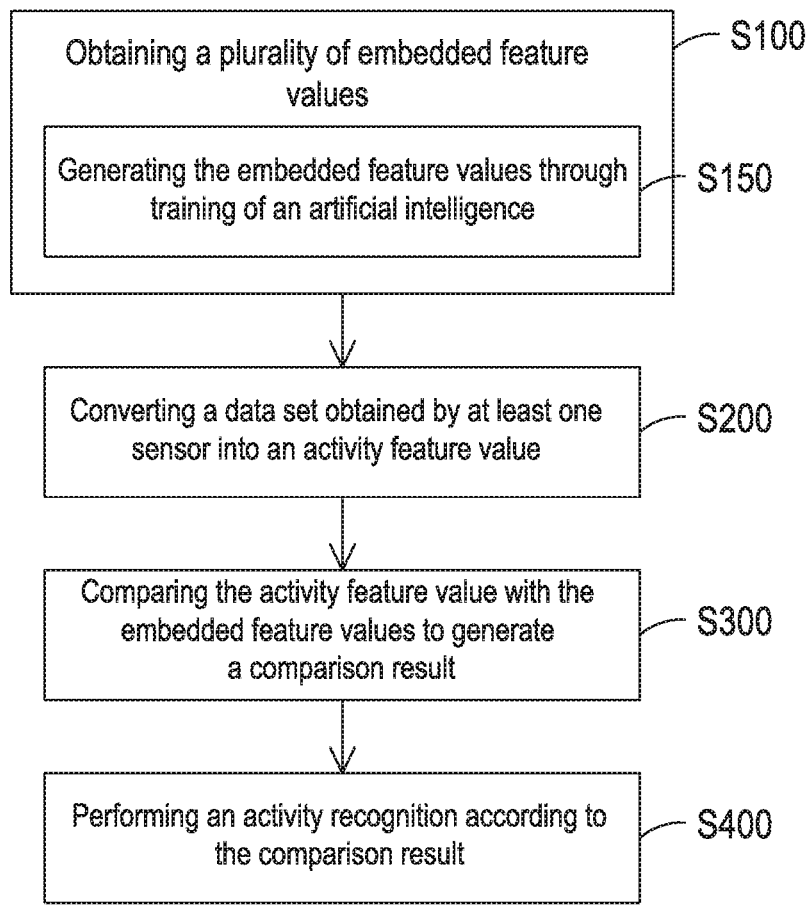
FIG. 8 schematically illustrates a flow chart of an activity recognition method according to an embodiment of the present invention.

Please refer to FIG. 8. FIG. 8 schematically illustrates a flow chart of an activity recognition method according to an embodiment of the present invention. As shown in FIG. 8, according to an embodiment of the present invention, the step S100 of the activity recognition method further includes a step S150. The step S150 is a step of generating the embedded feature values through training of an artificial intelligence. In this embodiment, the sample rate of the training data can be 200 times/second (Hz). Each 2.5 seconds are considered as a frame. If the six-axis sensors are utilized, the dimension of a frame is 6*200*2.5. Then, the batch normalization of the convolutional neural network (CNN) is performed on the photo frame. After the batch normalization is completed, a L2 norm is performed to generate the embedded feature value through the structure of deep learning. The dimension of the trained embedded feature value can be in a range from 128 to 1024, but not limited herein.

Figure 9:
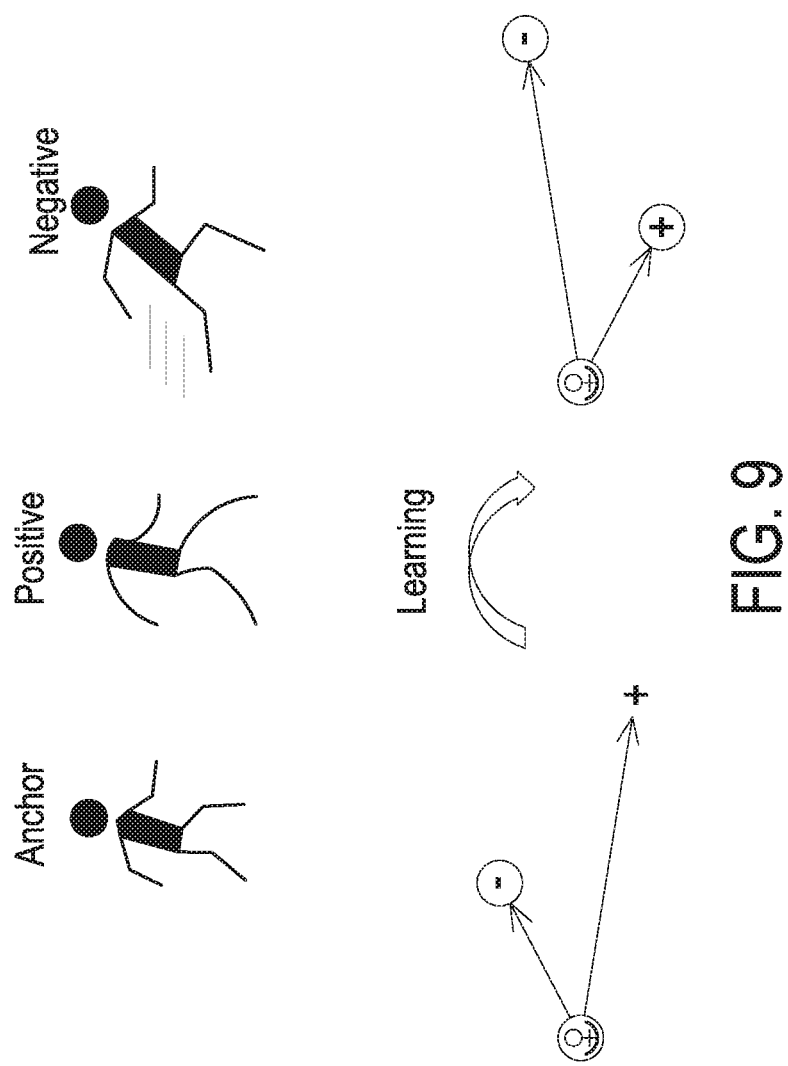
FIG. 9 schematically illustrates an anchor activity, a positive activity, a negative activity, and the distance relationships of the anchor activity, the positive activity, and the negative activity before and after an adjustment of learning.

The training of the artificial intelligence of the activity recognition method of the present invention is illustrated in FIG. 9. FIG. 9 schematically illustrates an anchor activity, a positive activity, a negative activity, and the distance relationships of the anchor activity, the positive activity, and the negative activity before and after an adjustment of learning. As shown in FIG. 9, when an activity of a normal walk is considered as an anchor activity, a similar walk will be considered as a positive activity, and an activity which is more different from the normal walk such as running will be considered as a negative activity. Before training of the artificial intelligence, it is possible that a negative activity is closer to the anchor activity than a positive activity. However, after training of the artificial intelligence, it will be corrected, such that the positive activity will be closer to the anchor activity than a negative activity, and the negative activity will be far away from the anchor activity. Therefore, the precision of the activity recognition is greatly enhanced.

Figure 10:
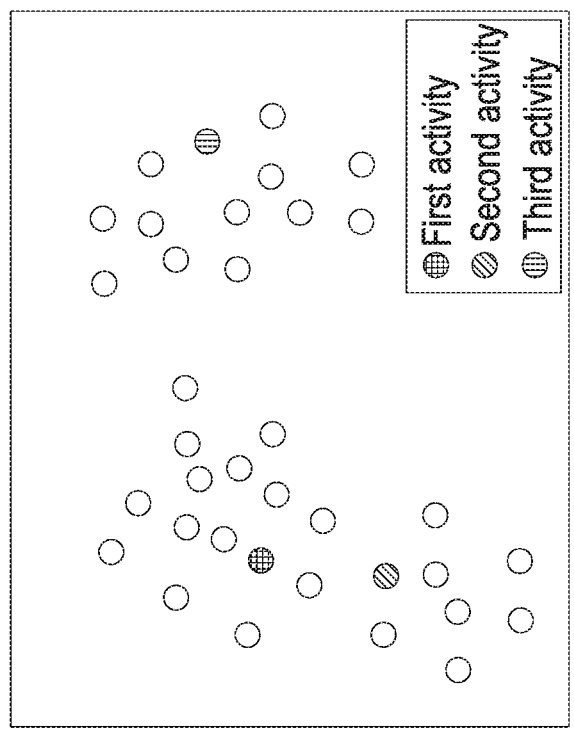
FIG. 10 schematically illustrates a first activity, a second activity, and a third activity registered in a Euclidean space as being a central point value of embedded feature values of an activity recognition method according to an embodiment of the present invention.

Please refer to FIG. 8 and FIG. 10. FIG. 10 schematically illustrates a first activity, a second activity, and a third activity registered in a Euclidean space as being a central point value of embedded feature values of an activity recognition method according to an embodiment of the present invention. As shown in FIG. 8 and FIG. 10, in an embodiment of the activity recognition method of the present invention, when an activity is firstly acted by a user, the activity feature value obtained by the sensor is registered as an embedded feature value for being corresponded to a new activity. For example, when a first activity is firstly acted by a user, the activity feature value of the first activity obtained by the sensor is registered as a central point of embedded feature values corresponded to the first activity in a Euclidean space, which is the center of a cluster of the first activity. When a second activity is firstly acted by the user, the activity feature value of the second activity obtained by the sensor is registered as a central point of embedded feature values corresponded to the second activity in the Euclidean space, which is the center of a cluster of the second activity. When a third activity is firstly acted by the user, the activity feature value of the third activity obtained by the sensor is registered as a central point of embedded feature values corresponded to the third activity in the Euclidean space, which is the center of a cluster of the third activity. In addition, each of the embedded feature values is greater than or equal to a central point value minus a difference, and less than or equal to the central point value plus the difference. In other words, the difference decides the dimension of the embedded feature values. The definition or selection of the difference can be varied according to the practical demands, but not limited herein.

Figure 11:
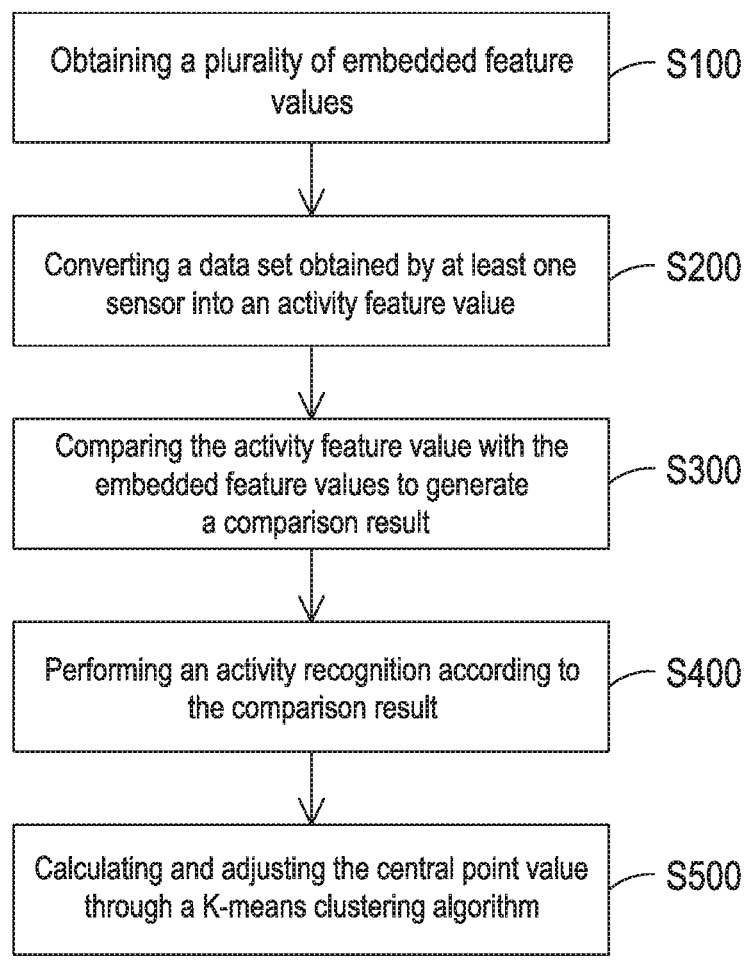
FIG. 11 schematically illustrates a flow chart of an activity recognition method according to an embodiment of the present invention.
Figure 12:
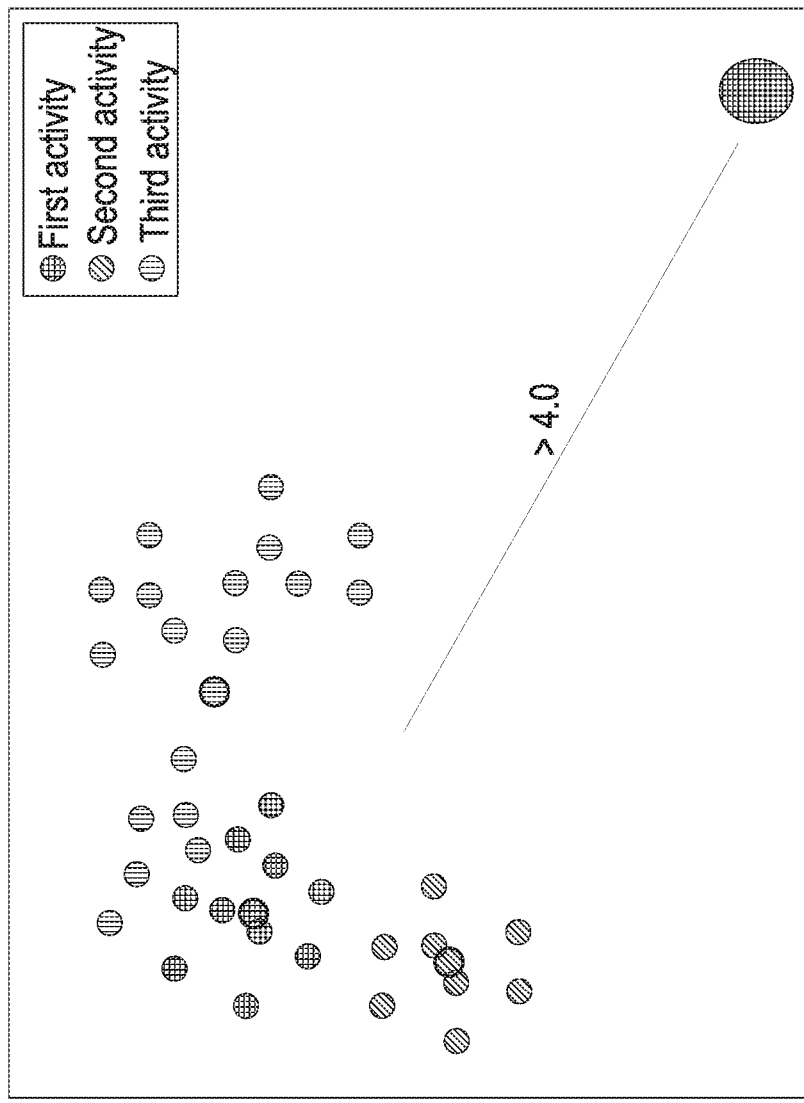
FIG. 12 schematically illustrates an activity feature value in the Euclidean space shown in FIG. 10.
Figure 13:
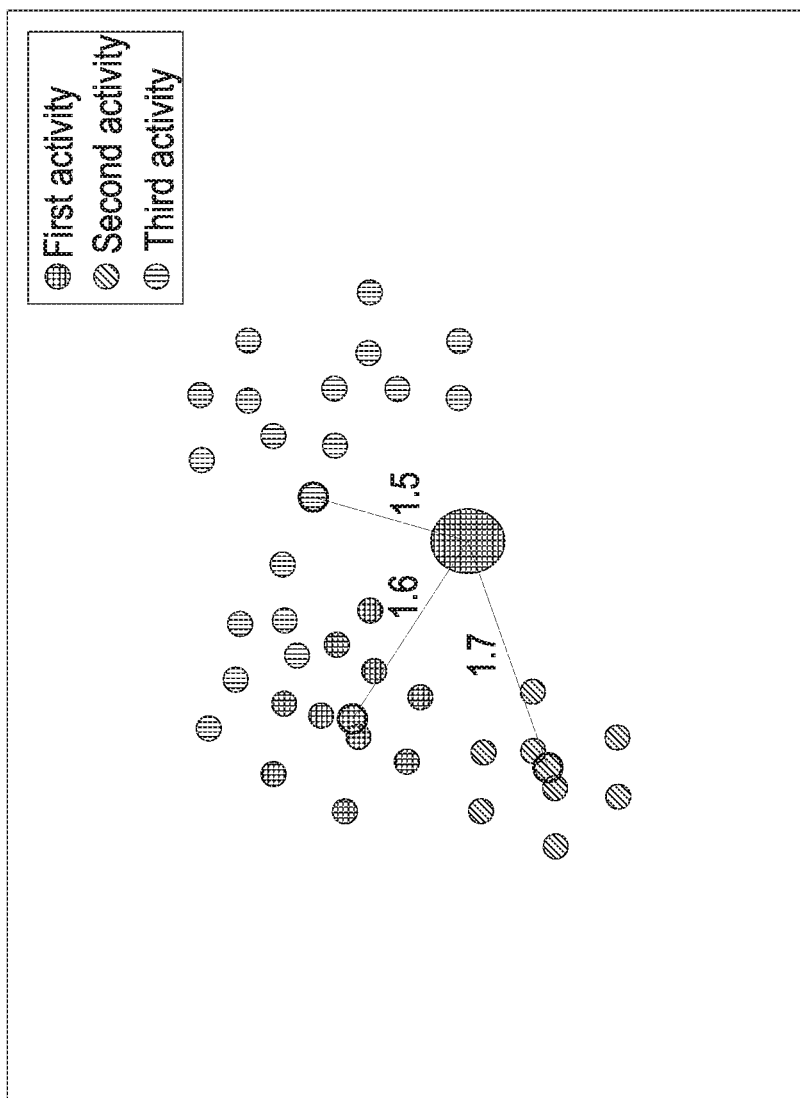
FIG. 13 schematically illustrates an activity feature value in the Euclidean space shown in FIG. 10.

Please refer to FIG. 10, FIG. 11, FIG. 12, and FIG. 13. FIG. 11 schematically illustrates a flow chart of an activity recognition method according to an embodiment of the present invention. FIG. 12 schematically illustrates an activity feature value in the Euclidean space shown in FIG. 10. FIG. 13 schematically illustrates an activity feature value in the Euclidean space shown in FIG. 10. As shown in FIGS. 10-13, according to an embodiment of the present invention, an activity recognition method further includes a step S500, after the step S400, of calculating and adjusting the central point value through a K-means clustering algorithm. In the step S500, the position of the center of the cluster in the Euclidean space is adjusted. In the step S500, a Euclidean distance between the activity feature value and a corresponded one of the embedded feature values is preferred to be calculated through the K-means clustering algorithm. When (1) the Euclidean distance is greater than a first threshold, (2) the differences between Euclidean distances corresponded to the embedded feature values are less than a specific value, or (3) any two Euclidean distances are equal, the activity feature value is excluded, and the central point value is not adjusted. In the situation (1), the first threshold can be 4.

The detailed description of the previous paragraph is described as following. When an activity feature value (as the point having a larger volume shown in FIG. 12) is much farther from each center of the clusters, the Euclidean distance is greater than the first threshold (e.g. greater than 4), it means that the activity feature value is not matched with each embedded feature value. It is not necessary to adjust the position of the center of the cluster. If an adjustment is performed, the center of the cluster will be imprecise. It is the reason why the activity recognition method of the present invention excludes the activity feature value which is much farther from each center of the clusters. The position of the center of the cluster is not adjusted. Moreover, when the Euclidean distances between the activity feature value (as the point having a larger volume shown in FIG. 13) and the embedded feature values are too small, or two identical Euclidean distances are existed, the practical activity of the user cannot be precisely recognized. Under this circumstance, the activity recognition method of the present invention also excludes the activity feature value. The position of the center of the cluster is not adjusted.

Furthermore, when the Euclidean distance is less than or equal to the first threshold, the central point value is adjusted. In other words, the position of the center of the cluster in the Euclidean space is adjusted. As a result, accompanying with the adjustments, the ability of the activity recognition of the activity recognition method of the present invention is enhanced to be more consistent with the activities of the user. It should be noted that after the central point value is adjusted, a count value corresponded to the activity feature value and an adjusted central point value are recorded, and the activity feature value itself is not recorded. Therefore, no matter how many times an activity feature value is obtained, the storage space is occupied by only a count value and an adjusted central point value. The usage of the calculation and the memory can be effectively reduced. The waste of resources is reduced, and the efficiency is enhanced. For example, as shown in FIG. 13, assuming the number of the points representing the third activity is M, the center of the cluster is U, and the newly added point is i, the new center of the cluster Unew=(U*M+i)/M+1. Only the count value and the value of each center of each cluster are stored, the usage of the calculation and the memory can be effectively reduced.

Figure 14:
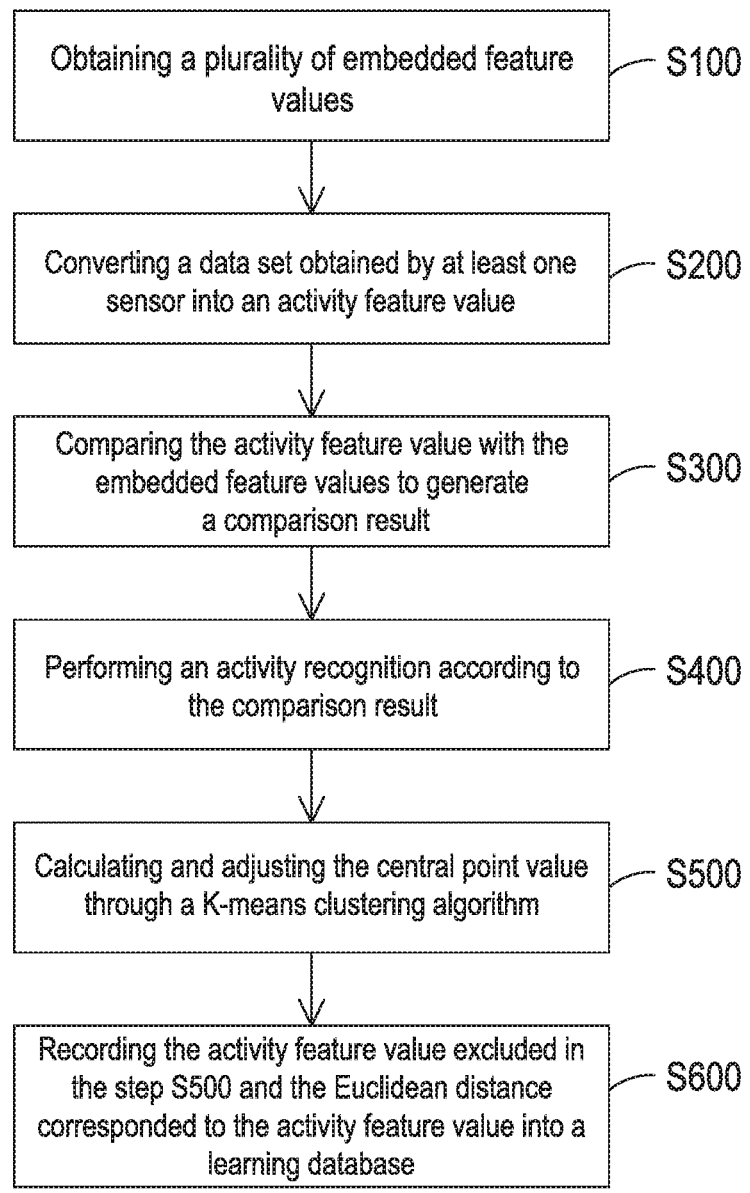
FIG. 14 schematically illustrates a flow chart of an activity recognition method according to an embodiment of the present invention.

Please refer to FIG. 4 and FIG. 14. FIG. 14 schematically illustrates a flow chart of an activity recognition method according to an embodiment of the present invention. As shown in FIG. 4 and FIG. 14, according to an embodiment of the present invention, an activity recognition method further includes a step S600, after the step S500, of recording the activity feature value excluded in the step S500 and the Euclidean distance corresponded to the activity feature value into a learning database. The learning database can be built-in in the database 13 of the activity recognition system 1, or can be an independent learning database, but not limited herein. When a specific number of recorded activity feature values with Euclidean distances less than a second threshold are existed in the learning database, a new embedded feature value is created with the specific number of recorded activity feature values, and the new embedded feature value is corresponded to a new activity. The second threshold can be 2. In other words, when a new activity is acted by the user many times, the activity feature value of each time acting the new activity is similar, and the number of times is greater than a specific number, the new activity will be automatically learned by the activity recognition method and the activity recognition system and a new embedded feature value and the new activity corresponded to the new embedded feature value are correspondingly built.

Figure 15:
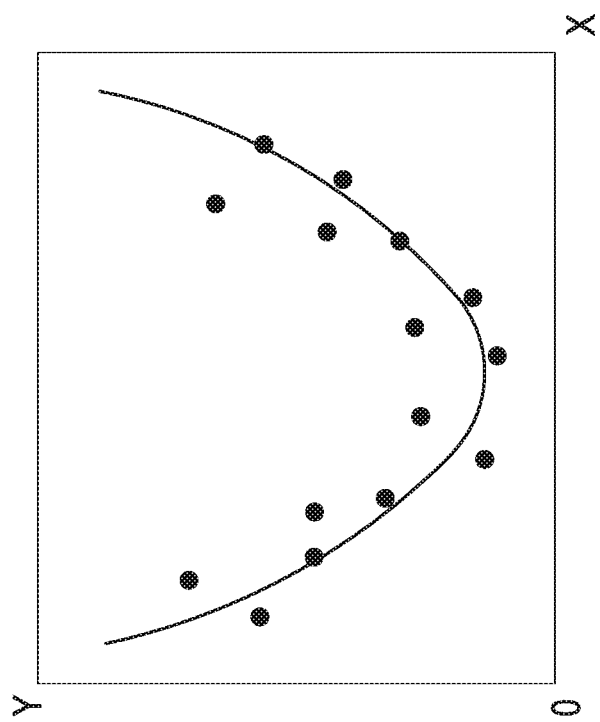
FIG. 15 schematically illustrates a statistic chart showing the ability of generalization of an artificial intelligence model of the present invention.

Please refer to FIG. 15. FIG. 15 schematically illustrates a statistic chart showing the ability of generalization of an artificial intelligence model of the present invention. The ability of generalization of the artificial intelligence model of the present invention is shown in FIG. 15. The matching curve can be effectively corresponded to each activity feature. The ability of the generalization is nice. It can be seen that the features of automatic learning and continuous learning of artificial intelligence can be provided by the activity recognition method of the present invention. The activity recognition ability of the present invention can be continuously adjusted and trained, such that the activity recognition ability is more consistent with the activity of the user, and the generalization ability is effectively improved without over-optimization.

Figure 16:
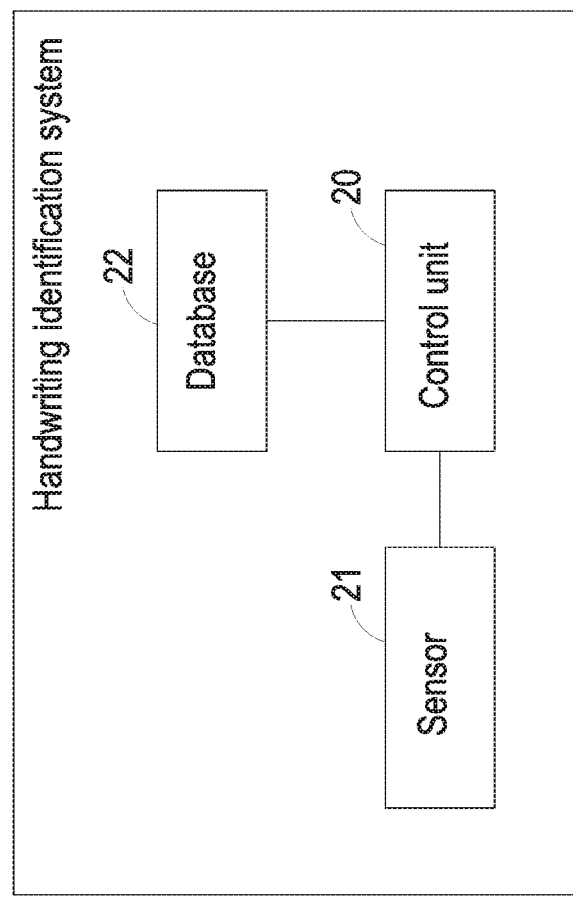
FIG. 16 schematically illustrates a configuration of a handwriting identification system according to an embodiment of the present invention.

In addition, based on the method and the framework of the present invention, a recognition or an identification applied to another fields can be implemented. Please refer to FIG. 16. FIG. 16 schematically illustrates a configuration of a handwriting identification system according to an embodiment of the present invention. As shown in FIG. 16, according to an embodiment of the present invention, a handwriting identification system 2 includes a control unit 20, a sensor 21, and a database 22. The sensor 21 is connected with the control unit 20. Handwriting is obtained by the sensor 21 according to a signing activity of a signer. The database 22 is connected with the control unit 20. At least an embedded feature handwriting is stored in the database 22. The embedded feature handwriting is corresponded to a registered user. The control unit 20 calculates a Euclidean distance between the handwriting and the embedded feature handwriting through a K-means clustering algorithm. When the Euclidean distance is less than or equal to a threshold, the signer is identified as same as the registered user. In this way, the handwriting identification system 2 of the present invention can be provided to financial institutions or other applications to check whether the signer is the registered user himself. Furthermore, this handwriting identification system 2 can also have the features of automatic learning and continuous learning of the aforementioned activity recognition method and activity recognition system to increase the generalization ability and accuracy in the future. It can also be bound with the hardware of a smart pen to replace manual comparison of handwriting.

From the above description, the present invention provides an activity recognition method, an activity recognition system, and a handwriting identification system. By converting the data set obtained by the sensor into the activity feature value, comparing the activity feature value and the embedded feature values to generate the comparison result, and performing the activity recognition according to the comparison result, the advantages of precisely recognizing activities are achieved. Meanwhile, through the method and the framework of automatic learning and continuous learning with artificial intelligence, the activity recognition ability of the present invention can be continuously adjusted and trained, such that the activity recognition ability is more consistent with the activity of the user, and the generalization ability is effectively improved without over-optimization. In addition, since the present invention only records the count value corresponding to the activity feature value and the adjusted center point value, it can effectively reduce the calculation and memory usage, thereby reducing the waste of resources and achieving better performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An activity recognition method, comprising steps of:
   (a) obtaining a plurality of embedded feature values;
   (b) converting a data set obtained by at least one sensor into an activity feature value;
   (c) comparing the activity feature value with the embedded feature values to generate a comparison result; and
   (d) performing an activity recognition according to the comparison result,
   wherein one of the embodiment feature values which is closest to the activity feature value is found out by the comparison result, and each of the embedded feature values is corresponded to an activity,
   wherein each of the embedded feature values is greater than or equal to a central point value minus a difference, and less than or equal to the central point value plus the difference.

2. The activity recognition method according to claim 1, wherein the step (a) comprises steps of:
   (a1) allowing the at least one sensor to individually obtain a raw data from a plurality of activities which are firstly performed by a user; and
   (a2) utilizing the raw data as an input data to generate the embedded feature values through training of an artificial intelligence.

3. The activity recognition method according to claim 1, wherein the step (a) comprises a step of: (a0) generating the embedded feature values through training of an artificial intelligence.

4. The activity recognition method according to claim 1, further comprising a step, after the step (d), of: (e) calculating and adjusting the central point value through a K-means clustering algorithm.

5. The activity recognition method according to claim 4, wherein in the step (e), a Euclidean distance between the activity feature value and a corresponded one of the embedded feature values is calculated through the K-means clustering algorithm, and when
   (1) the Euclidean distance is greater than a first threshold,
   (2) the differences between Euclidean distances corresponded to the embedded feature values are less than a specific value, or
   (3) any two Euclidean distances are equal,
   the activity feature value is excluded, and the central point value is not adjusted.

6. The activity recognition method according to claim 5, wherein when the Euclidean distance is less than or equal to the first threshold, the central point value is adjusted.

7. The activity recognition method according to claim 6, wherein after the central point value is adjusted, a count value corresponded to the activity feature value and an adjusted central point value are recorded, and the activity feature value itself is not recorded.

8. The activity recognition method according to claim 5 further comprising a step, after the step (e), of: (f) recording the activity feature value excluded in the step (e) and the Euclidean distance corresponded to the activity feature value into a learning database, wherein when a specific number of recorded activity feature values with Euclidean distances less than a second threshold are existed in the learning database, a new embedded feature value is created with the specific number of recorded activity feature values, and the new embedded feature value is corresponded to a new activity.

9. The activity recognition method according to claim 8, wherein the first threshold is 4, and the second threshold is 2.

10. An activity recognition system, comprising:
    a control unit;
    a first sensor connected with the control unit, wherein a first sensed data is obtained by the first sensor according to an activity of a user;
    a second sensor connected with the control unit, wherein a second sensed data is obtained by the second sensor according to the activity of the user; and
    a database connected with the control unit, wherein a plurality of embedded feature values are stored in the database,
    wherein the control unit converts the first sensed data and the second sensed data into an activity feature value and compares the activity feature value with the embedded feature values so as to perform an activity recognition on the activity,
    wherein one of the embedded feature values which is closest to the activity feature value is found out by the comparison result, and each of the embedded feature values is corresponded to an activity,
    wherein each of the embedded feature values is greater than or equal to a central point value minus a difference, and less than or equal to the central point value plus the difference.

* * * * *